Patented Sept. 17, 1946

2,407,703

UNITED STATES PATENT OFFICE 2,407,703

AMINO AMIDE COMPOUNDS

Saul Kaplan, Rutherford, N. J., assignor to Onyx Oil & Chemical Company, a corporation of Delaware No Drawing. Application April 10, 1942, Serial No. 438,433

6 Claims. (Cl. 260—404.5)

This invention relates to new amino amide compounds.

The new amino amide compounds are useful for various purposes as surface active or capillary active compounds. They are useful, for example, as wetting, emulsifying, foaming, dispersing and penetrating agents, as detergents, as frothing and flotation agents, for bactericidal, fungicidal and insecticidal purposes, as auxiliaries for processing textile materials, as water repellents for textile materials, etc.

The new amino amide compounds have the following general graphically represented formula:

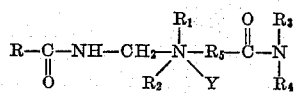

wherein R is an aliphatic, cyclo-aliphatic, or naphthenyl radical containing more than ten carbon atoms, $R_1$ and $R_2$ stand for lower alkyl groups such as the methyl, ethyl, propyl, or butyl radicals, $R_1$ and $R_2$ together stand for an alkylene ring which may contain oxygen as in morpholine or which may be free from oxygen as in piperidine, $R_3$ and $R_4$ stand for hydrogen or for lower alkyl groups such as the methyl, ethyl, propyl, or butyl radicals, or where $R_3$ and $R_4$ together stand for an alkylene ring, as in morpholine or piperidine, $R_5$ stands for an alkylene group such as a methylene, ethylene, propylene or trimethylene group, and Y is a salt-forming anion, such as acetate, formate, chloride, bromide, methosulfate, phthalate, phosphate, maleate, etc.

According to one method of manufacture the new products may be made by reacting the chlormethylamide,

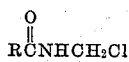

with the tertiary amino acid amide,

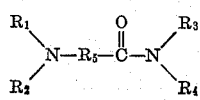

in which $R_1$, $R_2$, $R_3$, $R_4$ and $R_5$ have the significance stated above. The reaction takes place readily at room temperature in most cases with the evolution of heat; and an inert solvent such as benzene, methylene dichloride or ethylene dichloride may advantageously be present.

The chlormethyl amide used in making the new compounds may be prepared as described in United States Patent No. 2,259,650.

The process in which the chlormethyl amide is used yields the new product in the form of the chloride. Other and alternative methods of manufacture of the chloride are illustrated in the examples as well as the manufacture of other salts than the chloride.

The tertiary amino acid amides used in making the new compounds may be produced by known methods from the chloroacid chlorides, esters, or amides, and secondary amines. They are relatively non-volatile materials, and of slight odor for a compound bearing an amino group.

I am aware that it has been proposed to produce products of the type

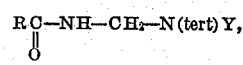

where R and Y have the meaning above defined, and N(tert) is a tertiary amine such as pyridine or trimethyl amine; but insofar as I am aware it is new to form products from tertiary amino acid amides; and it is rather surprising that the tertiary amine amide when used in making the new compounds of the present invention would yield products as useful and in some cases more useful than the products derived from the tertiary amines, since the presence of the polar group

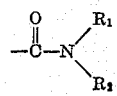

might be expected to modify the reactivity of the amine amide compounds and the activity of the compounds derived from them.

I have found that the new compounds are stable to acids, foam vigorously, possess little or no odor, and yet possess the thermal instability necessary to yield permanently water repellent finishes on textile fibers.

The new products have the advantage over products produced from tertiary amines of almost total lack of odor.

As suitable tertiary amino acid amides for use in making the new compounds may be mentioned the following: dimethyl-amino-acetic acid dimethyl amide, morpholine-N-acetic acid morpholine amide, diethyl-amino-acetic acid diethyl amide, dimethyl-amino-acetic acid amide, diethyl-amino-acetic acid amide, morpholine-N-acetic acid amide, dimethyl-amino-propionic acid dimethyl amide, etc. The acetic acid derivatives are conveniently made from chloracetic acid, chloracetyl chloride or ethyl chloracetate, and the corresponding secondary amines. Mixed secondary amines such as methyl-ethyl amine can also be used. It is most convenient to make those amino amides which contain the same secondary amine; however, by appropriate methods, amino amides containing different amines, such as those derived from chloracetamides, can be made, and used for the purposes of this invention.

For products which are intended as water repellents for textile materials R is advantageously a long hydrocarbon group or chain such as is obtained when stearamide or arachidamide are used in producing the new compound.

The new compounds contain polar and nonpolar groups, or hydrophobic and hydrophilic groups; and the balance between these groups can be varied in producing the new compounds depending upon the particular tertiary amino acid amide employed and the compounds with which it is reacted in making the new compounds. For water repellency it is desirable to have as large a hydrophobic chain or group as possible but in practice the size is limited by the ability of the hydrophobic group to solubilize the fatty portion. If a solvent impregnation is employed, somewhat larger hydrophobic groups can be employed.

Among the new products which may be produced according to the present invention are those containing as the fatty radical or hydrophobic group (R in the above formula) a carbon chain of about 10 to 14 carbon atoms, and containing 6 to 10 carbon atoms in the amino-amide portion of the molecule. Such products are advantageous, for example, as germicidal agents. For detergency and foaming properties in the products it is desirable to have 14 to 16 carbon atoms in the hydrophobic or fatty group or radical.

Where the new products are made from amino amides containing the amides of secondary amines, for example, dimethyl-amino-acetic acid dimethyl amide, the products have the graphically represented formula:

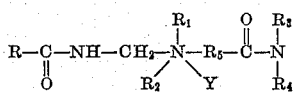

in which $R_3$ and $R_4$ as well as $R_1$ and $R_2$ are alykl groups or form part of a ring by being joined as in morpholine or piperidine. In such products R is advantageously a straight chain, either saturated or singly unsaturated, and containing from 10 to 22 carbon atoms. Thus, for example, in the above formula $R_1$, $R_2$, $R_3$ and $R_4$ may all be ethyl or methyl or $R_1$ and $R_2$, and also $R_3$ and $R_4$, may together form part of a ring structure derived from morpholine or piperidine. Thus the long hydrocarbon chain may be a saturated chain when derived e. g. from lauric, palmitic, stearic or other saturated acid or from the corresponding alcohol, and may contain one double bond, for example, when derived from oleic acid or oleyl alcohol.

The new amino amide compounds of the present invention will be further illustrated by the following specific examples, describing the production and utilization of certain of these products but it will be understood that the invention is not limited thereto. In the following examples the parts are by weight.

*Example 1.*—32 parts of chlormethylstearamide (containing about 5% of thionyl chloride) is added to 19 parts of dimethyl amino-acetic acid dimethyl amide dissolved in 30 parts of diethyl carbitol. The reaction sets in with the evolution of heat, and the mixture is then heated to 60° C. for one hour to insure completion of the reaction.

The product is a pasty material which dissolves readily in water to form foaming solutions, and may be used for the production of durable water repellent finishes on fabrics. It has the formula:

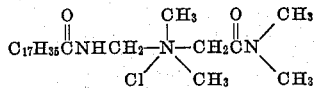

*Example 2.*—20 parts of stearamide, 4 parts of paraformaldehyde and 40 parts of glacial acetic acid are melted together with stirring for forty minutes in a water bath at 80° C. 32 parts of dimethyl amino-acetic acid dimethyl amide are added with 25 parts of acetic anhydride. The mixture is heated for four hours, at the end of which time the product is soluble in water and foams. The product may be used and sold as it is for the production of permanent water repellent finishes on textile fabrics; however, the product may be recrystallized from acetone, enabling the recovery of large amounts of acetic acid. The product has the following formula:

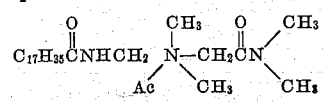

where Ac stands for the acetate radical $-OOCCH_3$.

*Example 3.*—270 parts of stearamide, 30 parts of paraformaldehyde and 500 parts of ethylene dichloride are heated together for nine hours at 75°–80° C. At the end of this time, the mixture is cooled to 15° C. and 140 parts of dimethyl amino-acetic acid dimethyl amide are added. While being held at 15°–30° C., 40 parts of phosphorus trichloride are slowly added. The reaction mixture is then heated to 60° C. and kept at this temperature for one-half hour. It is then cooled at 10° C., filtered and dried. The product consists of mixed phosphites and chlorides of the ammonium compound, having the following formula:

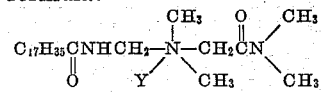

where Y is $H_2PO_3^-$, and $Cl^-$.

*Example 4.*—32 parts of chlormethylstearamide containing about 5% of thionyl chloride is added to a solution of 21 parts of diethyl amino-acetic acid diethylamide in 30 parts of methylene chloride. The reaction mixture, a viscous paste, is stirred under reflux for a half hour at 60° C., and the ethylene dichloride removed by evaporation at reduced pressure. The product obtained is an almost white powder, which dissolves in water, gives capillary-active solutions, and can be used for the production of water repellent effects on textiles. It has the following formula:

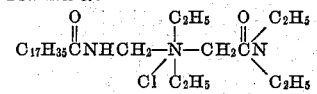

*Example 5.*—32 parts of chlormethylstearamide containing about 5% of thionyl chloride is added to a solution of 23 parts of morpholine-N-acetic acid morpholine amide in 35 parts of diethyl carbitol. The mixture, a viscous paste, is heated to 60° C. for one hour to assure completion of the reaction. The product may be used as obtained for the production of water repellent effects on fabrics. It has the following formula:

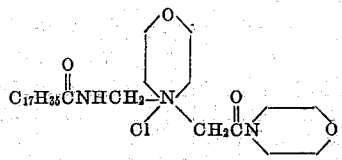

*Example 6.*—56 parts of stearamide, 100 parts of methyl ethyl ketone, 2 parts of pyridine and 8 parts of paraformaldehyde are mixed together at a temperature of 90° C. in a stirrer capable of handling a viscous mixture. 42 parts of dimethyl amino-acetic acid dimethyl amide hydrochloride are added and the mixture stirred for 6 to 12 hours. At the end of this time, the material is soluble in water to give a foamy solution. It may be used and sold as obtained, or the methylethyl ketone may be removed by washing the product with acetone. The product has the formula indicated in Example 2.

*Example 7.*—Three pounds of the product of Example 1 are dissolved in water at 40° C. containing one-half pound of formic acid (90%). The solution is then diluted to 100 pounds and used to impregnate wool gabardine, using a mangle or other conventional equipment. The solution is preferably kept at 33°–38° C. to insure wetting of the wool. After the impregnation, the cloth is dried at 40° C. and then baked at 120° C. for 30 minutes. The fabric is water repellent and is suitable for the manufacture of overcoats, raincoats, etc.

*Example 8.*—A solution of from 2½%–5% of the product of Example 2 (after the precipitation of the product with acetone) is made containing from .4–.8% of formic acid as described in Example 7. This solution is used to impregnate cotton gabardine in a padder. The cotton is dried at 50° C. in a current of hot air and then subjected to a baking at 140° C. to 160° C. for from 6 to 3 minutes.

If the maximum degree of softness and water repellency is desired, the cloth is then washed in a dilute solution of soap or synthetic detergent for 5 minutes at 60° C. and dried. About 0.05–0.1% of the synthetic detergent or 0.1–0.2% of soap is sufficient. Without the washing, the goods are water repellent but traces of unreacted amine amide compounds tend to decrease the repellency.

*Example 9.*—A solution made up as described in Example 8 is used to impregnate nylon parachute cloth. After drying at 40° C. the cloth is baked at 150° C. for 30 minutes. The cloth is rendered permanently water repellent.

It will be noted from the foregoing examples that the new products can be produced from different starting materials and according to different methods of production and that the individual products vary somewhat in their properties and may be used in some cases without further purification, or may be further purified if desired.

It will also be noted that the above examples illustrate some of the various applications of the new products when used as such or with subsequent treatment, e. g., by heating or baking to impart water repellent properties to fabrics. It is one advantage of the new products as hereinbefore pointed out that they possess a desirable stability at ordinary temperatures but possess the thermal instability necessary to yield permanently water repellent finishes on textile fabrics when applied thereto and subsequently heated or baked, as illustrated in certain of the above examples.

I claim:

1. New amino amide compounds of the following general formula

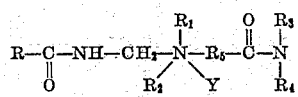

in which R is a hydrocarbon group containing more than 10 carbon atoms; $R_1$ is of the class consisting of (1) lower alkyl radicals, (2) alkylene radicals linked to $R_2$ by a carbon to carbon linkage and (3) alkylene radicals linked to $R_2$ through an oxygen atom; $R_2$ is of the class consisting of (1) lower alkyl radicals, (2) alkylene radicals linked to $R_1$ by a carbon to carbon linkage and (3) alkylene radicals linked to $R_1$ through an oxygen atom; $R_3$ is of the class consisting of (1) hydrogen, (2) lower alkyl radicals, (3) alkylene radicals linked to $R_4$ by a carbon to carbon linkage and (4) alkylene radicals linked to $R_4$ through an oxygen atom; $R_4$ is of the class consisting of (1) hydrogen, (2) lower alkyl radicals, (3) alkylene radicals linked to $R_3$ by a carbon to carbon linkage, and (4) alkylene radicals linked to $R_3$ through an oxygen atom; $R_5$ is an alkylene group and Y is a salt-forming anion.

2. New amino amide compounds of the following general formula

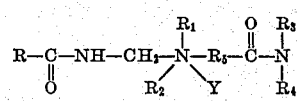

in which R is a hydrocarbon group containing more than 10 carbon atoms, $R_1$, $R_2$, $R_3$ and $R_4$ are lower alkyl radicals having not more than 4 carbon atoms, $R_5$ is an alkylene radical having not more than 3 carbon atoms and Y is a salt-forming anion.

3. New amino amide compounds of the following general formula

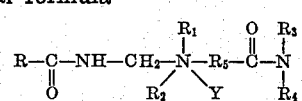

in which R is a straight chain hydrocarbon group containing 10 to 22 carbon atoms; $R_1$ is of the class consisting of (1) lower alkyl radicals, (2) alkylene radicals linked to $R_2$ by a carbon to carbon linkage and (3) alkylene radicals linked to $R_2$ through an oxygen atom; $R_2$ is of the class consisting of (1) lower alkyl radicals, (2) alkylene radicals linked to $R_1$ by a carbon to carbon linkage and (3) alkylene radicals linked to $R_1$ through an oxygen atom; $R_3$ is of the class consisting of (1) hydrogen, (2) lower alkyl radicals, (3) alkylene radicals linked to $R_4$ by a carbon to carbon linkage and (4) alkylene radicals linked to $R_4$ through an oxygen atom; $R_4$ is of the class consisting of (1) hydrogen, (2) lower alkyl radicals, (3) alkylene radicals linked to $R_3$ by a carbon to carbon linkage, and (4) alkylene radicals linked to $R_3$ through an oxygen atom; $R_5$ is an alkylene group and Y is a salt-forming anion.

4. New amino amide compounds of the following general formula

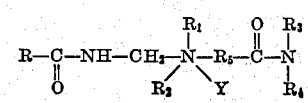

in which R is a straight chain hydrocarbon group containing 10 to 22 carbon atoms, $R_1$, $R_2$, $R_3$ and $R_4$ are alkyl radicals having not more than 2 carbon atoms, $R_5$ is an alkylene group and Y is a salt-forming anion.

5. New amino amide compounds of the following general formula

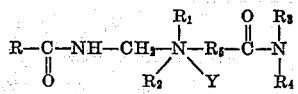

in which R is a straight chain hydrocarbon radical containing 10 to 22 carbon atoms, $R_1$, $R_2$, $R_3$ and $R_4$ are methyl radicals, $R_5$ is an alkylene group and Y is a salt-forming anion.

6. New amino amide compounds of the following general formula

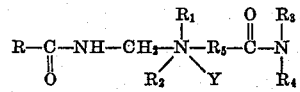

in which R is a straight chain saturated hydrocarbon group containing 10 to 22 carbon atoms, $R_1$, $R_2$, $R_3$ and $R_4$ are alkyl radicals having not more than 2 carbon atoms, $R_5$ is an alkylene group and Y is a salt-forming anion.

SAUL KAPLAN.